FLORA & BOGLE.
Churn.
No. 63,493. Patented April 2, 1867.
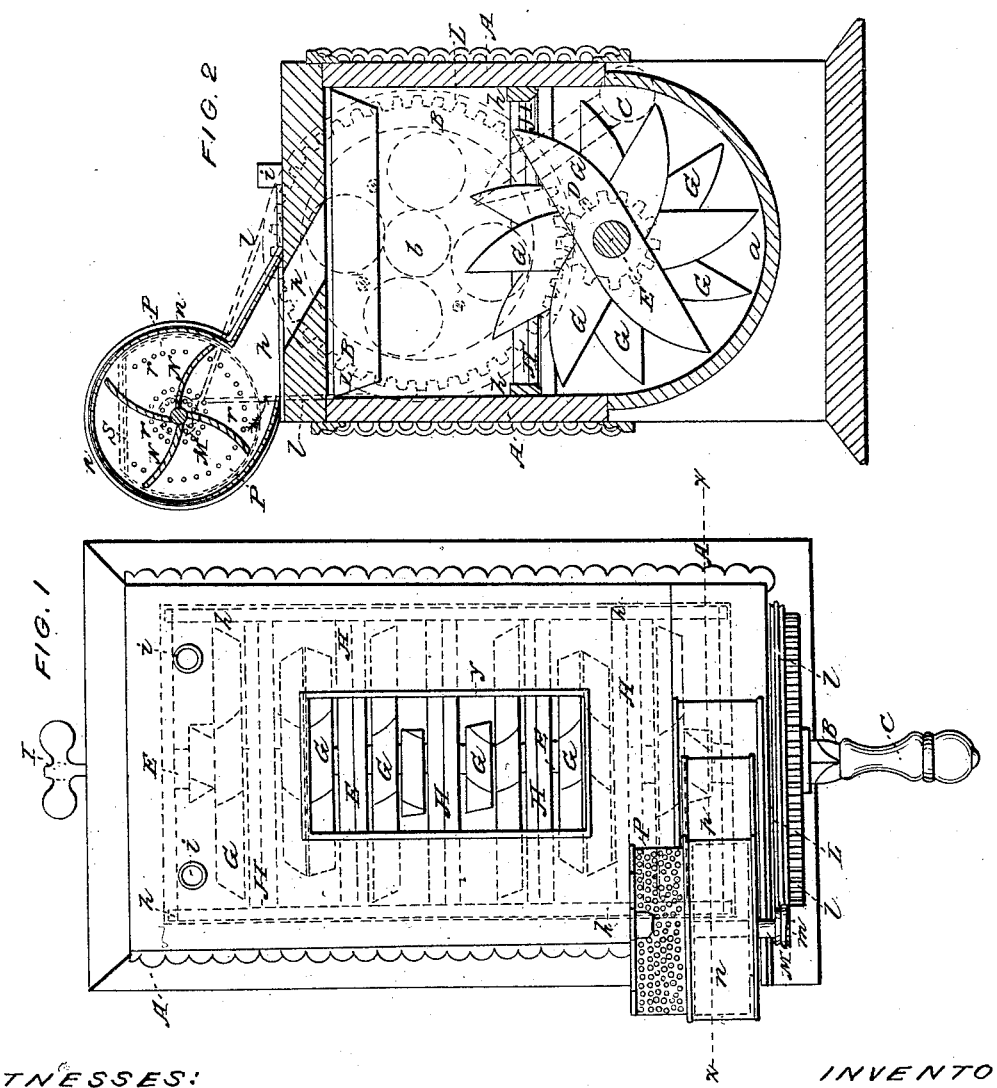

United States Patent Office.

ORLANDO V. FLORA, OF MADISON, INDIANA, AND JAMES S. BOGLE, OF SPRINGFIELD, OHIO.

*Letters Patent No. 63,493, dated April 2, 1867.*

---

IMPROVEMENT IN CHURNS.

---

*The Schedule referred to in these Letters Patent and making part of the same.*

---

TO ALL WHOM IT MAY CONCERN:

Be it known that we, ORLANDO V. FLORA, of Madison, in the county of Jefferson, and State of Indiana, and JAMES S. BOGLE, of Springfield, in the county of Clark, and State of Ohio, have invented an improved Churn; and we do hereby declare that the following is a full and exact description thereof, reference being had to the accompanying drawings, making part of this specification—

Figure 1 being a top view of the churn.

Figure 2, a transverse vertical section thereof, in a plane indicated by the line $x\ x$, fig. 1.

Like letters designate corresponding parts in both figures.

We employ an oblong churn-body, A, preferably, the bottom $a$, fig. 2, being semi-cylindrical, and the dashers G G revolve concentrically therein, and pretty closely thereto, while there is a considerable rectangular space above the dashers, substantially as represented in the drawings. The dasher-shaft E extends through one end of the churn-body, and a pinion, D, shown by red lines in fig. 2, is secured on the projecting end. A driving cog-wheel, B, gears into the pinion D, and drives the dashers, there being a crank, C, or its equivalent, secured to said cog-wheel to apply the power by. Upon the top of the churn-body, near one end, substantially as shown, is located a fan-blower, N, in its case $n$. To the projecting shaft M of this fan a pulley, $m$, is secured, and a larger pulley, L, is secured upon the shaft $b$ of the driving-wheel B, or is attached immediately to or made with the wheel itself, from which pulley a band, $l$, extends to said pulley $m$, whereby motion is communicated to the fan. The air is driven from the fan through a passage, $p$, at one end of the churn, thus mingling forcibly with the cream in motion, and hastening the act of churning, as well as improving the quality of the butter. A vent for the used air is furnished through tubes, $i\ i$, in the cover of the churn, near the other end thereof in relation to the situation of the fan. The air to supply the fan N is received through one end or head of its case $n$, and enclosing said end is an ice-box or chamber, P, whose lid, $s$, is perforated to admit the air, as well as the end or head between the ice-chamber and the interior of the fan case, substantially as shown. By putting ice in this box or chamber, and thereby cooling the air as it is admitted to the fan, the cream is nicely cooled in hot weather, or when necessary, and produces butter of superior quality. In lieu of ice in the chamber P, a wet sponge may be employed with good effect, but not so good as with the ice. The dasher is composed of a considerable number of bevelled arms, G G, which revolve in connection with grate bars or breaker slats, H H, which are connected by a frame, $h\ h$, fitting the inside of the churn-body, and are thereby retained horizontally at a height a little below the upward projection of the dasher-arms, so that the latter can pass closely between them, as shown. These dasher-arms are so arranged on their shaft E in longitudinal rows, that, first, the end arms enter the cream, then the others in succession toward the centre, while the arms are so bevelled as to throw the cream toward the ends of the churn. The next row in order reverses this arrangement of the arms, but is so bevelled as to throw the cream against the breaker slats. Then, when it is desired to gather the butter, after being made, by reversing the motion of the dasher, the order of the arms entering the liquid will be reversed, while they are all so bevelled as to throw toward the centre of the churn, thus effectively and rapidly gathering the butter.

What we claim as our invention, and desire to secure by Letters Patent, is—

The combination of the dasher G G, breaker slats H H, fan N, and ice-box or chamber P, arranged and operating substantially as and for the purpose herein specified.

The above specification of our improved churn signed by us the day and date hereafter mentioned.

Signed at Madison, county of Jefferson, State of Indiana, this sixteenth day of June, 1866.

ORLANDO V. FLORA.

Witnesses:
 H. C. SANXAY,
 C. E. WALKER.

Signed at Springfield, Clark county, Ohio, June 25, 1866.

JAMES S. BOGLE.

Witnesses:
 J. G. DUNLAP,
 THOS. K. MELVIN.